(12) United States Patent
Yang et al.

(10) Patent No.: US 12,479,526 B2
(45) Date of Patent: Nov. 25, 2025

(54) SYSTEMS, METHODS, AND APPARATUS FOR E-DRIVE KIT FOR TRAILERS

(71) Applicant: Toyota Motor Engineering & Manufacturing North America, Inc., Plano, TX (US)

(72) Inventors: Charlie Yang, The Colony, TX (US); Tapan Patel, South Lyon, MI (US); Brian Woods, Brighton, MI (US); Heraldo Stefanon, Dexter, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 379 days.

(21) Appl. No.: 18/116,246

(22) Filed: Mar. 1, 2023

(65) Prior Publication Data
US 2024/0294222 A1  Sep. 5, 2024

(51) Int. Cl.
*B62D 59/04* (2006.01)
*B60L 1/00* (2006.01)
(Continued)

(52) U.S. Cl.
CPC .............. *B62D 59/04* (2013.01); *B60L 1/006* (2013.01); *B60L 15/20* (2013.01); *B60L 50/64* (2019.02);
(Continued)

(58) Field of Classification Search
CPC .......... B60L 1/006; B60L 15/20; B60L 50/64; B60L 50/66; B60L 53/51; B60L 53/52; B62D 59/04
See application file for complete search history.

(56) References Cited

U.S. PATENT DOCUMENTS 8,789,472 B2   7/2014  Mai
10,449,954 B2  10/2019  Layfield et al.
(Continued)

FOREIGN PATENT DOCUMENTS

DE  202016006076 U1  12/2016
DE  102016220905 A1   4/2018
(Continued)

OTHER PUBLICATIONS

Flaherty, Nick, "Bosch has developed an electrified energy harvesting axle for truck trailers that can be used for autonomous operation", Technology News, Aug. 28, 2018, pp. 1-5.
(Continued)

*Primary Examiner* — Luke Huynh
(74) *Attorney, Agent, or Firm* — Snell & Wilmer LLP (57) ABSTRACT

A system for providing an e-drive kit for a trailer connected to a towing vehicle. The system includes a motorized axle, a plurality of energy storage devices, and a controller coupled to the motorized axle and the plurality of energy storage devices. The motorized axle may be configured to control one or more wheels connected to the motorized axle. The controller may be configured to control the motorized axle to transfer energy generated by the one or more wheels to the plurality of energy storage devices for storage of the transferred energy. The controller may further be configured to receive data indicative of a driving maneuver of the towing vehicle. The controller may further be configured to control the motorized axle to actuate the one or more wheels based on the driving maneuver of the towing vehicle.

19 Claims, 3 Drawing Sheets

(51) Int. Cl.
*B60L 15/20* (2006.01)
*B60L 50/60* (2019.01)
*B60L 50/64* (2019.01)
*B60L 53/51* (2019.01)
*B60L 53/52* (2019.01)

(52) U.S. Cl.
CPC .............. *B60L 50/66* (2019.02); *B60L 53/51* (2019.02); *B60L 53/52* (2019.02); *B60L 2200/28* (2013.01)

(56) References Cited

U.S. PATENT DOCUMENTS

| | | | |
|---|---|---|---|
| 10,766,478 B2* | 9/2020 | Healy | B60W 30/18127 |
| 10,926,818 B1 | 2/2021 | Sasu | |
| 2010/0141201 A1* | 6/2010 | Littrell | H02S 40/32 320/101 |
| 2019/0202429 A1 | 7/2019 | Richter et al. | |
| 2019/0233034 A1 | 8/2019 | Viele et al. | |
| 2021/0300136 A1* | 9/2021 | Algüera | B60D 1/64 |

FOREIGN PATENT DOCUMENTS

| | | |
|---|---|---|
| DE | 102017121571 A1 | 3/2019 |
| DE | 102019130859 A1 | 5/2020 |
| WO | WO2018210865 A1 | 11/2018 |

OTHER PUBLICATIONS

Brawner, Steve, "Industry Eyes E-Axles, Systems Can Augment Diesel, Support Electric Trucks", Transport Topics, © 2022, Jan. 19, 2018, pp. 1-4.

ZF Friedrichshafen AG, "On Fast Track Towards Tailor-Made Electric Drive", © ZF Friedrichshafen AG, https://www.zf.com/products/en/stories_31809.html, pp. 1-7.

* cited by examiner

FIG. 3

SYSTEMS, METHODS, AND APPARATUS FOR E-DRIVE KIT FOR TRAILERS

BACKGROUND

Field

The present disclosure is directed to systems, methods, and apparatus for providing an e-drive kit for trailers.

Description of the Related Art

Fuel-efficient vehicles (e.g., hybrid, plug-in hybrid, electric, fuel cell vehicles, etc.) continue to gain popularity over the years. Energy storage devices (e.g., batteries) of the fuel-efficient vehicles that supply power to their motors (e.g., electric motor, internal combustion engine, and/or the like) to propel the vehicles may also supply power to native components of the vehicles (e.g., air conditioner, seat heater, infotainment unit, etc.) as well as remote devices (e.g., refrigerator, ventilator, music player, speaker, outdoor light, electric stove, smartphone, etc.). Some energy storage devices may even supply power to homes, businesses, and recreational vehicles (RVs). For example, some vehicles (e.g., pick-up trucks, vehicles towing trailers, and/or the like) may use vehicle batteries to supply power to remote devices while a user is participating in recreational outdoor activities such as camping, providing emergency services, working in a construction site, etc.

Several challenges exist with such a fuel-efficient vehicle which conventionally requires a charging station (e.g., at home, outdoors, etc.) to charge its energy storage device (e.g., battery). For example, there are a limited number of charging stations (e.g., quick-charge or fast-charge charging stations) currently available in convenient locations as desired by the consumers, and a limited driving range such a vehicle can travel before requiring charging may diminish even further when, e.g., a trailer is attached to the vehicle, resulting in a heavier load. The limited driving range may increase driver anxiety (e.g., regarding whether the vehicle can reach its destination or a charging station before running out of energy available on the vehicle).

Due to versatile use of batteries (e.g., providing back-up or off-grid power) that requires a high level of energy availability as well as the limited driving range of travel that the batteries provide for, e.g., electric vehicles, improved ways of generating and providing additional energy are desirable. Hence, there is a need for advanced systems, methods, and apparatus to generate and provide additional energy for an electric vehicle, especially when a trailer is attached.

SUMMARY

Described herein is a system for providing an e-drive kit for a trailer connected to a towing vehicle. The system includes a motorized axle configured to control one or more wheels connected to the motorized axle, a plurality of energy storage devices configured to store energy, and a controller coupled to the motorized axle and the plurality of energy storage devices. The controller may be configured to control the motorized axle to transfer energy generated by the one or more wheels to the plurality of energy storage devices for storage of the transferred energy, receive data indicative of a driving maneuver of the towing vehicle, and control the motorized axle to actuate the one or more wheels based on the driving maneuver of the towing vehicle.

Also described is an apparatus for providing an e-drive kit for a trailer connected to a towing vehicle. The apparatus includes a motorized axle configured to control one or more wheels connected to the motorized axle, a plurality of energy storage devices configured to store energy, and a controller coupled to the motorized axle and the plurality of energy storage devices. The controller may be configured to control the motorized axle to transfer energy generated by the one or more wheels to the plurality of energy storage devices for storage of the transferred energy, receive data indicative of a driving maneuver of the towing vehicle, and control the motorized axle to actuate the one or more wheels based on the driving maneuver of the towing vehicle.

Moreover, also described is a method for providing an e-drive kit for a trailer connected to a towing vehicle. The method includes controlling, by a controller, a motorized axle connected to one or more wheels to transfer energy generated by the one or more wheels to a plurality of energy storage devices connected to the motorized axle, receiving, by the controller, data indicative of a driving maneuver of the towing vehicle, and controlling, by the controller, the motorized axle to actuate the one or more wheels in response to receiving the data indicative of the driving maneuver of the towing vehicle.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Purpose of the systems, methods, and apparatus for providing an e-drive kit as described herein is to provide a complete e-drive kit to electrify existing and newly developed trailers or other towed vehicles (such as, e.g., campers). This e-drive kit allows an existing or newly developed trailer to provide power to its wheels for improved dynamics and safety and accept power from the wheels for improved efficiency and additional driving range for a vehicle towing the trailer. The e-drive kit also allows power take-off from the trailer via charge connector and/or power outlet(s). In other words, the trailer with the e-drive kit installed on the trailer can be used to power other equipment. Furthermore, the e-drive kit described herein can reduce range anxiety for users, reduce the required frequency or number of stops for charging for the towing vehicle, assist off-grid travel (e.g., via eliminating the need for additional generators which can be noisy and require additional fuel), enable monitoring and managing of energy storage and consumption on the towing vehicle and the trailer, enable charging of energy storage device(s), provide a drive axle with launch assist, enable use of regenerative braking, provide additional reservoir of energy, etc.

The e-drive kit can be installed on new trailers or other new towed vehicles (such as, e.g., large or heavy campers) or retrofitted onto existing trailers or other existing towed vehicles. The e-drive kit can include one or more of a motorized axle (e-axle), a motor, a differential, an energy storage system (e.g., a battery pack, a controller, and battery management software) including a plurality of energy storage devices, a charge port (e.g., SAE J1772 for AC (alternating current) charging, Combined Charging System (CCS) for DC (direct current) charging, etc.), a breakaway switch, power take-off outlet(s) and necessary controller(s), and/or optional renewable energy source(s) such as solar panel(s) or wind turbine(s), and can be installed on any type of recreational trailer (e.g., a camper, a flat bed, a box, etc.). Furthermore, the e-drive kit can include and/or connect to an additional charge port and/or a charger on the trailer. Moreover, if an unplanned disconnection from the towing vehicle occurs while the trailer with the e-drive kit is being towed, a breakaway switch can activate and bring the trailer to a safer stop (i.e., safer than without the breakaway switch mechanism).

In some embodiments, the plurality of energy storage devices described herein can include a plurality of stackable batteries (which, in some examples, may be located within a frame/under a floorboard of the trailer). Furthermore, in some embodiments, the system for providing the e-drive kit described herein can control the motorized axle to provide additional assistance with turning and/or other maneuver(s) (including stopping) of the towing vehicle. In some embodiments, the system can provide additional power take-off outlet(s) (e.g., standard AC 120V or 240V outlets, USB, etc.). In some embodiments, the system can also provide launch assistance for, e.g., a trailer with the e-drive kit described herein installed thereon (which may also help with combustion vehicles). Moreover, in some embodiments, the system can include a breakaway switch mechanism, wherein data communication can occur between the towing vehicle and the trailer over, e.g., a 6/7-pin connector and cause the trailer to slow down or stop when the trailer is disconnected from the towing vehicle while moving. Further, in some embodiments, various types of information can be shared on a software application program running on a user device (e.g., a tablet, a smartphone, etc.) which can communicate with, e.g., a controller of the system described herein and include a meter cluster.

The e-drive kit described herein provides a control system as well as a driving and a braking system that provides independent driving force or slowing or stopping of the wheels on the trailer, thus allowing the towing vehicle to achieve improved dynamics and safety as well as improved efficiency and additional driving range.

Figure 1:
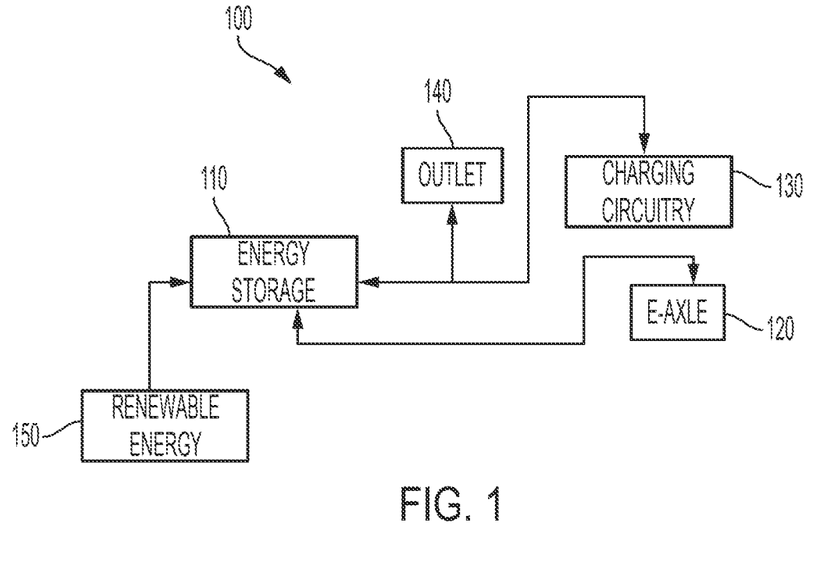
FIG. 1 is a block diagram of a system including an e-drive kit for a trailer according to an embodiment of the present invention.

Turning to FIG. 1, a system 100 for providing an e-drive kit for a trailer is disclosed. Throughout the disclosure, the system 100 may also be referred to as the e-drive kit. The system 100 includes a plurality of energy storage devices 110 and a motorized axle (e-axle) 120. The system 100 may also include a charging device or circuitry 130 and a power take-off outlet 140. Additionally, the system 100 may include (e.g., optionally) a renewable energy source 150. While not explicitly shown, the system 100 may also include a differential (to allow varied levels of actuation of one or more wheels (not shown) attached to the motorized axle 120), one or more motors of various types (to actuate the one or more wheels via the motorized axle 120), a charge port (e.g., SAE J1772, CCS, etc.), a breakaway switch, and a controller for, e.g., the power take-off outlet 140. The system 100 or the e-drive kit can be installed or retrofitted on any type of recreational trailer (e.g., a camper, a flat bed, a box, etc.). Moreover, while not shown, one or more of the components described herein with respect to the system 100 may be coupled to and controlled by a controller (e.g., an electronic control unit (ECU)) to function as described herein. The e-drive kit described herein including the system 100 may be implemented as part of or retrofitted on various types of towed vehicles such as, e.g., a camper, a trailer, etc. The camper or the trailer including the e-drive kit can operate as an "e-camper" or an "e-trailer" providing bi-directional charging, exterior power outlet(s), a configurable deck (e.g., on the e-trailer), an additional back-up power source (e.g., via energy storage device(s) of configurable size(s)), and capability to carry additional load(s) (e.g., for additional storage and/or various activities with bicycles, kayaks, ATVs (all-terrain vehicles), personal watercraft, tools, etc.).

In various embodiments, the controller or the ECU described above with respect to the system 100 may include or couple to one or more processors. These one or more processors may be implemented as a single processor or as multiple processors. For example, the controller or the ECU of the system 100 may be a microprocessor, a data processor, a microcontroller, or other controller, and may be electrically and/or physically coupled to some or all of the components described herein with respect to the system 100 and/or one or more components disposed on a towing vehicle towing the trailer.

Some or all of the components of the system 100 may also include one or more controllers which may include one or more processors specifically designed and programmed for the respective functions of the components (e.g., including the controller for the power take-off outlet 140 discussed above). The functionalities of these controllers may be implemented in a single controller or in multiple controllers. Each controller may receive data from one or more of the components of the system 100, may make determinations relating to, e.g., operations of the respective component based on the received data, and may control the operations of the respective component based on the determinations. The request for execution of any of the operations of the respective component may be based on a user input (e.g., a driver) received via a user interface (e.g., a microphone, a touch screen, etc.) or one or more types of data captured by, e.g., one or more sensors (e.g., a location sensor, an image sensor, etc.).

The system 100 may also include a memory (not shown) including any non-transitory memory and may store data usable by the system 100 (e.g., the controller or the ECU of the system 100). The memory may be located within or on the trailer when the e-drive kit is installed or retrofitted on the trailer and may be referred to as a local memory. In some embodiments, the memory may be available and accessible (e.g., via a wired connection or wirelessly) from a remote location (e.g., a towing vehicle, a remote server, etc.) away from the trailer and may be referred to as a remote memory. In some embodiments, the remote memory may be accessed via wireless communications utilizing one or more wireless communications protocols.

In various embodiments, the plurality of energy storage devices 110 may include a battery system (e.g., a battery pack, a controller, and battery management software). In some embodiments, the plurality of energy storage devices 110 may include a plurality of stackable batteries. The plurality of stackable batteries can provide many benefits and advantages such as efficiently receiving, storing, and/or delivering electrical energy in a user-configurable and versatile manner. Additional benefits and/or advantages include: (1) battery mass carried on a route may be minimized as needed; (2) the modular/stackable batteries may be small enough to be manually manipulated (i.e., by hand); and (3) the batteries may connect to existing devices such as wireless charging units (e.g., in a parking space with wireless capabilities) for a "no-touch" charging/discharging customer experience.

The plurality of energy storage devices 110 (i.e., batteries) may be stackable and removable from the trailer and/or the system 100 and may be housed in corresponding receptacles (not shown) to which the batteries can be connected. As but one example, the plurality of energy storage devices 110 (i.e., batteries) may be clicked into the receptacles (i.e., under tension). In some embodiments, the receptacles, the system 100, and/or the trailer may include necessary ports, wiring, and/or connections for enabling the connections between the plurality of energy storage devices 110 (e.g., housed in the corresponding receptacles) and other components within the system 100 or external devices, such that the plurality of energy storage devices 110 and/or the receptacles may be easily removable from the system 100 or the trailer without interrupting any functionality of the system 100 or the trailer or any complicated disconnection and/or re-wiring of the remaining ones of the plurality of energy storage devices 110. Thus, the plurality of energy storage devices 110 may be added to or removed from the system 100 or the trailer as needed (e.g., additional energy storage devices may be added to the system 100 or the trailer to increase available capacity and/or power of the system 100 or the trailer).

The removability and transportability of the plurality of energy storage devices 110 may allow one or more of the plurality of energy storage devices 110 to be repurposed or refurbished as, e.g., a mobile range extender, a home back-up battery, or a mobile power station (e.g., on demand). In some embodiments, the plurality of energy storage devices 110 may be fixed in secure manner on the trailer. In various embodiments, the connection for the plurality of energy storage devices 110 may be of a DC-DC boost converter or an AC to onboard charger (inverter). As a brief aside, different levels of SOC (state of charge) for the plurality of energy storage devices 110 may be balanced before the plurality of energy storage devices 110 are connected in serial or parallel.

In some embodiments, the plurality of energy storage devices 110 may be ergonomically sized (e.g., with respect to handle width, handle grip, etc. and including a movement assistance with rollers) such that the plurality of energy storage devices 110 may be easily removable and/or transportable, thus allowing the plurality of energy storage devices 110 to be easily repurposed and/or exchanged. In some embodiments, the plurality of energy storage devices 110 may be stackable within the trailer when functioning as a range extender.

In various embodiments, the plurality of energy storage devices 110 may include or make up a battery system including a battery pack, a controller, and battery management software. The controller and the battery management software of the battery system may, using the various components described herein with respect to the system 100, manipulate the balancing, transfer, etc. of energy within, from, and/or to the battery system including the plurality of energy storage devices 110.

The motorized axle (e-axle) 120 may include one or more motors (i.e., single or dual/multiple motors). The motorized axle 120 may adopt an in-wheel motor setup with a remote inverter controller in some embodiments. Providing the in-wheel motor setup (i.e., with the motors being included or packaged in the space within the offset of the wheels and having the remote inverter controller) may eliminate a need for the differential in the system 100 because the wheels may be individually controlled via the in-wheel motors.

In various embodiments, the motorized axle 120 may be connected to the plurality of energy storage devices 110 and employ regenerative braking to generate power when the trailer including the system 100 is braking (i.e., slowing down), and the generated power may be transferred to the plurality of energy storage devices 110 to be stored. For example, the system 100 may detect that the trailer is slowing down from the motorized axle 120 (e.g., via one or more sensors (not shown) connected to the motorized axle 120 detecting a speed or a change in the speed of the rotation of the wheels connected to the motorized axle 120 and/or a speed or a change in the speed of the towing vehicle or the trailer, etc. and providing such sensor data to the controller or the ECU of the system 100) and/or receive an indication from the towing vehicle (e.g., from an electronic control unit (ECU) or CAN (controller area network) bus on the towing vehicle) that the towing vehicle is braking. The data communication between the system 100 and the towing vehicle and/or the trailer may enable adjusting or balancing of the braking and the regenerative braking as needed or designed.

Furthermore, as described further herein with respect to the differential on the system 100, the motorized axle 120 may actuate one or more of the wheels attached to the motorized axle 120 to assist with the driving maneuver of the towing vehicle connected to the trailer. For example, the motorized axle 120 may be controlled (e.g., by the controller or the ECU of the system 100) to cause the one or more wheels to mimic or complement the driving maneuver of the towing vehicle (e.g., relating to the speed and/or the direction of the driving maneuver of the towing vehicle) based on the detection of the driving maneuver of the towing vehicle. That is, the one or more wheels may be actuated so as to enable the trailer to achieve the similar or same speed and/or direction of the driving maneuver of the towing vehicle.

In various embodiments, the charging device or circuitry 130 may include a circuitry connected to the plurality of energy storage devices 110 and be configured to draw energy from the plurality of energy storage devices 110 to provide charging capabilities for the trailer. For example, the charging device or circuitry 130 may be connected to the power take-off outlet 140 (including the connected controller) or other charge port(s) (e.g., SAE J1772, CCS, etc.) to provide power (e.g., from the plurality of energy storage devices 110) to an external device connected to the power take-off outlet 140 or the other charge port(s).

The other charge port(s) may include a "J-Plug" (i.e., SAE J1772) and/or a CCS connector between the towing vehicle and the trailer to support the current draw (e.g., AC or DC) from the plurality of energy storage devices 110 on the trailer to charge the towing vehicle. This connection may be a separate connection from the trailer connection for CAN communications (e.g., utilized for data communication between the towing vehicle and the trailer regarding the trailer battery information such as SOC, temperature, available power, etc.), signal/brake lights, etc. In some embodiments, the connection within or amongst the system 100, the trailer, and the towing vehicle may be made through the J1772 standard providing additional link(s) in addition to the connector for the CAN communications and the 6/7-pin plug for the lights.

Optionally, the system 100 may also include a renewable energy source 150 such as a solar panel, a wind turbine, or the like. The renewable energy source 150 may be connected to the plurality of energy storage devices 110 and may generate energy and transfer the generated energy to the plurality of energy storage devices 110 to be stored. For example, the renewable energy source 150 may provide energy to (i.e., charge) the plurality of energy storage devices 110 while the trailer is being driven or stationary. More energy may be charged to the plurality of energy storage devices 110 when the trailer is stationary since the trailer, when stationary, would require less energy to be drawn from the plurality of energy storage devices 110 for use.

The system 100 may also include a differential (i.e., a differential gear/gear box) to enable varied levels of actuation of one or more wheels (not shown) attached to the motorized axle 120 resulting in varied speeds. The differential may include a mechanism to allow the one or more wheels connected to the motorized axle 120 to turn at various speeds to assist the maneuver of the towing vehicle by actuating the one or more wheels on the trailer as needed for assisting the maneuver of the towing vehicle. For example, when the towing vehicle is first starting to move, the trailer may detect that the towing vehicle is starting to move and utilize its energy (e.g., stored in the plurality of energy storage devices 110) to control the motorized axle 120 to cause the one or more wheels on the trailer to turn so as to propel or "launch" the trailer and assist the movement of the towing vehicle, lessening the driving force required from the towing vehicle to move the towing vehicle and the trailer connected to the towing vehicle. In some embodiments, the motorized axle 120 may turn the orientation of the one or more wheels (i.e., at an angle) as needed to assist turning of the towing vehicle when the system 100 detects that the towing vehicle is turning. In some embodiments, the differential may include a mechanism to allow the one or more wheels to be disconnected from the e-axle to freely turn at different (e.g., higher) speeds to minimize losses of the towing vehicle.

Moreover, the system 100 may also include a breakaway switch which may cause the motorized axle 120 to safely slow down or stop the one or more wheels on the trailer (i.e., bring the trailer to a stop) when the trailer and the towing vehicle are disconnected while being driven, for example. This would allow the trailer to come to a safe stop even when disconnected from the towing vehicle. In various embodiments, the disconnection may be detected, activated and/or deactivated mechanically or electronically. For example, in some embodiments, a wire connection (e.g., through a wire harness that provides other functionalities between the towing vehicle and the trailer such as electrical signals for light signals on the trailer) may serve as a breakaway switch when it is disconnected. In some embodiments, a software algorithm may detect, e.g., changes in relative speeds and/or accelerations of the towing vehicle and the trailer via one or more sensors and trigger an emergency "breakaway" stop function described above when the difference in speed and/or acceleration meets a threshold value.

Figure 2:
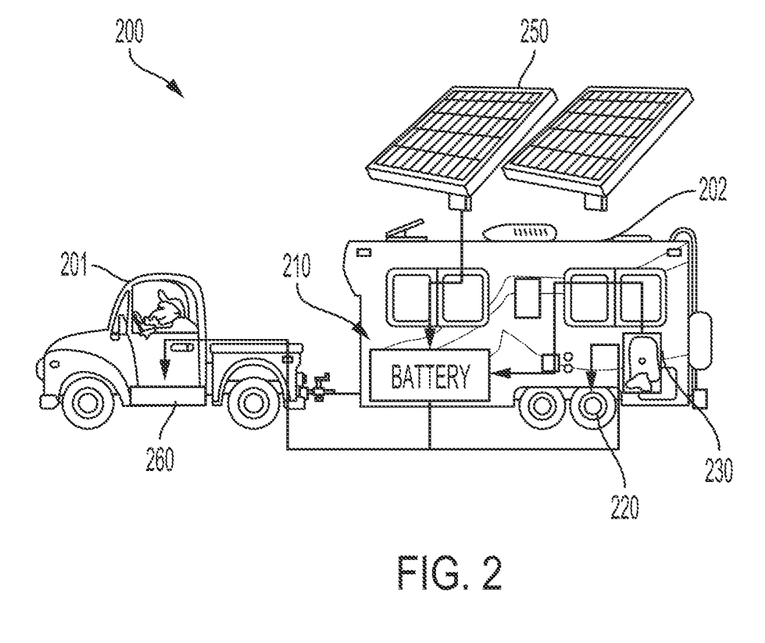
FIG. 2 is an illustration of a vehicle connected to a trailer with an e-drive kit according to an embodiment of the present invention.

FIG. 2 shows a system 200 including a vehicle connected to a trailer with an e-drive kit. The system 200 includes a towing vehicle 201 and a trailer 202. The trailer 202 may be similar to the trailer described herein with respect to FIG. 1. The trailer 202 may include an e-drive kit such as described herein with respect to FIG. 1 (i.e., the system 100). The e-drive kit may be installed or retrofitted on the trailer 202 and may include similar components as described herein with respect to FIG. 1, such as, e.g., a plurality of energy storage devices 210 (similar to the plurality of energy storage devices 110) and a motorized axle 220 (e-axle; similar to the motorized axle 120). The e-drive kit on the trailer 202 may also include a charging device or circuitry 230 (similar to the charging device or circuitry 130) and a renewable energy source 250 (similar to the renewable energy source 150). The components of the system 200 similar to the corresponding components of the system 100 may have similar structures and perform similar functions as described herein with respect to FIG. 1 and the corresponding components of the system 100.

The towing vehicle 201 may be a battery electric vehicle such as a battery electric truck or SUV (sport utility vehicle) or any other type of vehicle utilizing electricity to generate its driving force (e.g., utilizing an electric motor drawing power from an energy storage device or energy source 260 such as a battery) to propel itself.

The towing vehicle 201 may be non-autonomous, fully autonomous, or semi-autonomous. In that regard, an ECU on the towing vehicle 201 may control various aspects of the towing vehicle 201 (such as steering, braking, accelerating, or the like) to maneuver the towing vehicle 201 from a starting location to a destination location. In some embodiments, the towing vehicle 201 may be operated in an autonomous, semi-autonomous, or fully driver-operated state. In that regard, the towing vehicle 201 may be operated independently of driver control and, from time to time, without a person inside of the towing vehicle 201. The towing vehicle ECU may facilitate the autonomous functionality.

In various embodiments, the trailer 202 may be any type of trailer which may be coupled to the towing vehicle 201 to be towed and include a battery system including the plurality of energy storage devices 210 similar to the battery system and the plurality of energy storage devices 110 described herein with respect to FIG. 1 (e.g., including stackable batteries).

Advantageously, the system 200 can increase the driving range of the towing vehicle 201 because, similar to as described herein with respect to FIG. 1, the system 200 may generate additional energy from the motorized axle 220 which may be stored on the plurality of energy storage devices 210 and/or transferred to the energy storage device 260 on the towing vehicle 201, thus extending the driving range of the towing vehicle 201 based on the additionally available energy. Moreover, the driving assistance provided by the motorized axle 220 which actuates the one or more wheels on the trailer 202 may lessen the burden on energy to carry the additional load from the trailer 202 by providing the launch assistance of the trailer 202 from the one or more wheels on the trailer 202 being actuated, rather than relying solely on the driving force of the towing vehicle 201 to move the towing vehicle 201 and the trailer 202. This also allows for improved dynamics and safety by improving and/or stabilizing the drive of the towing vehicle 201 and the trailer 202. Furthermore, the additional driving range may also indicate that additional load may be hauled and offset the additional driving range (i.e., increased hauling capacity). The foregoing information may be displayed on a display (not shown) on the towing vehicle 201 and/or a user device (not shown) coupled to the system 200.

The e-drive kit described herein includes a whole axle system that may be installed or retrofitted onto the trailer 202 to replace a non-motorized axle. In various embodiments, the e-drive kit can work with various types of trailers, resulting in high compatibility and/or scalability. The e-drive kit may also be provided to an OEM trailer manufacturer or a third-party installer for installation or retrofitting.

Figure 3:
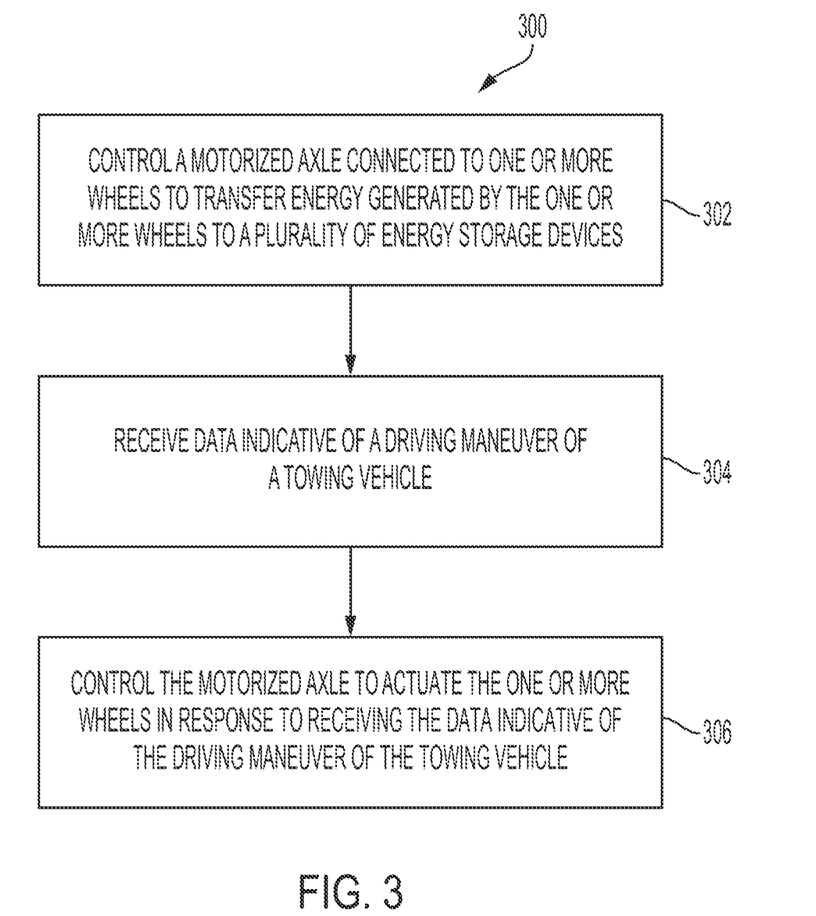
FIG. 3 is a flowchart illustrating a method for providing an e-drive kit for a trailer according to an embodiment of the present invention.

FIG. 3 is a method 300 for providing an e-drive kit for a trailer. The method 300 may be implemented via a plurality of instructions (e.g., a software program) stored on a memory and accessed and processed by a processor to perform the various steps of the method 300.

In step 302, the method 300 includes controlling a motorized axle connected to one or more wheels to transfer energy generated by the one or more wheels to a plurality of energy storage devices. In various embodiments, the energy generated by the one or more wheels includes the energy generated by the regenerative braking as described herein. The transferred energy may be stored on the plurality of energy storage devices as described herein.

In step 304, the method 300 includes receiving data indicative of a driving maneuver of the towing vehicle. In various embodiments, the data indicative of the driving maneuver of the towing vehicle may include launching, turning, or braking.

In step 306, the method 300 includes controlling, based on the driving maneuver of the towing vehicle, the motorized axle to actuate the one or more wheels. In various embodiments, the actuation of the one or more wheels includes actuating the one or more wheels so as to assist, e.g., the launching, turning, or braking of the trailer so as to mimic or complement the movement of the towing vehicle.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. A system for providing an e-drive kit for a trailer connected to a towing vehicle, the system comprising:
   a motorized axle configured to control one or more wheels of the trailer connected to the motorized axle;
   a plurality of energy storage devices configured to store energy;
   a breakaway switch connected to the motorized axle and configured to cause the motorized axle to slow down or stop movement of the one or more wheels when the trailer is disconnected from the towing vehicle; and
   a controller coupled to the motorized axle, the plurality of energy storage devices, and the breakaway switch and configured to:
      control the motorized axle to transfer energy generated by the one or more wheels to the plurality of energy storage devices for storage of the transferred energy;
      receive data indicative of a driving maneuver of the towing vehicle;
      control the motorized axle to actuate the one or more wheels based on the driving maneuver of the towing vehicle;
      detect when the trailer is disconnected from the towing vehicle; and
      control the breakaway switch to cause the motorized axle to slow down or stop movement of the one or more wheels when the trailer is disconnected from the towing vehicle.

2. The system of claim 1, further comprising a renewable energy source connected to the plurality of energy storage devices and configured to generate additional energy and provide the additional energy to the plurality of energy storage devices for storage thereon.

3. The system of claim 1, further comprising a charge port connected to the plurality of energy storage devices and configured to provide power to a connected external device.

4. The system of claim 1, further comprising a charging circuitry connected to the plurality of energy storage devices and configured to provide power to a connected external device.

5. The system of claim 1, further comprising an outlet for power take-off connected to the plurality of energy storage devices and configured to provide power to a connected external device.

6. The system of claim 1, wherein the plurality of energy storage devices include one or more stackable battery packs.

7. The system of claim 1, wherein the controller is further configured to:
   detect that the towing vehicle is initiating movement; and
   cause the motorized axle to control the one or more wheels to be actuated so as to assist launching of the trailer in response to the detection of the towing vehicle initiating the movement.

8. The system of claim 1, wherein the controller is further configured to:
   detect that the towing vehicle is turning; and
   cause the motorized axle to control the one or more wheels to be actuated so as to assist the turning of the towing vehicle.

9. An apparatus for providing an e-drive kit for a trailer connected to a towing vehicle, the apparatus comprising:
   a motorized axle configured to control one or more wheels of the trailer connected to the motorized axle;
   a plurality of energy storage devices configured to store energy;
   a breakaway switch connected to the motorized axle and configured to cause the motorized axle to slow down or stop movement of the one or more wheels when the trailer is disconnected from the towing vehicle; and
   a controller coupled to the motorized axle, the plurality of energy storage devices, and the breakaway switch and configured to:
      control the motorized axle to transfer energy generated by the one or more wheels to the plurality of energy storage devices for storage of the transferred energy;
      receive data indicative of a driving maneuver of the towing vehicle;
      control the motorized axle to actuate the one or more wheels based on the driving maneuver of the towing vehicle;
      detect when the trailer is disconnected from the towing vehicle; and
      control the breakaway switch to cause the motorized axle to slow down or stop movement of the one or more wheels when the trailer is disconnected from the towing vehicle.

10. The apparatus of claim 9, wherein the controller is further configured to control the plurality of energy storage devices to provide a prescribed amount of energy to the motorized axle so as to cause the one or more wheels to move.

11. The apparatus of claim 9, further comprising one or more in-wheel motors coupled, respectively, to the one or more wheels, the one or more in-wheel motors each configured to control movement of a corresponding wheel of the one or more wheels individually and independently from other wheels of the one or more wheels.

12. The apparatus of claim 9, further comprising a differential coupled to the one or more wheels and configured to control movement of the one or more wheels.

13. The apparatus of claim 9, further comprising a second controller coupled to the plurality of energy storage devices and configured to manage energy transfer from, to, or amongst the plurality of energy storage devices.

14. A method for providing an e-drive kit for a trailer connected to a towing vehicle, the method comprising:
controlling, by a controller, a motorized axle connected to one or more wheels of the trailer to transfer energy generated by the one or more wheels to a plurality of energy storage devices connected to the motorized axle;
receiving, by the controller, data indicative of a driving maneuver of the towing vehicle;
controlling, by the controller, the motorized axle to actuate the one or more wheels in response to receiving the data indicative of the driving maneuver of the towing vehicle;
detecting when the trailer is disconnected from the towing vehicle; and
controlling a breakaway switch to cause the motorized axle to slow down or stop movement of the one or more wheels when the trailer is disconnected from the towing vehicle.

15. The method of claim 14, further comprising controlling, by the controller, a renewable energy source coupled to the controller and the plurality of energy storage devices to generate an additional amount of energy and transfer the additional amount of energy to the plurality of energy storage devices for storage.

16. The method of claim 15, wherein controlling the renewable energy source to generate the additional amount of energy includes controlling at least one of a solar panel or a wind turbine to generate the additional amount of energy.

17. The method of claim 15, wherein controlling the renewable energy source to generate the additional amount of energy includes controlling the renewable energy source to generate the additional amount of energy while the trailer is stationary.

18. The method of claim 15, wherein controlling the renewable energy source to generate the additional amount of energy includes controlling the renewable energy source to generate the additional amount of energy while the trailer is in motion.

19. The method of claim 14, further comprising providing, by the controller, power to the one or more wheels by causing the plurality of energy storage devices to transfer a prescribed amount of energy to the one or more wheels.

\* \* \* \* \*